Jan. 9, 1968  G. E. BRAM  3,362,717
JOINT BETWEEN PIPES
Filed June 22, 1965

Inventor:
Georges Eugène
BRAM
by: J. Delattre-Seguy
Attorney

United States Patent Office 3,362,717
Patented Jan. 9, 1968

3,362,717
JOINT BETWEEN PIPES
Georges Eugène Bram, Pont-a-Mousson, France, assignor to Centre de Recherches de Pont-a-Mousson, Pont-a-Mousson, France, a French body corporate
Filed June 22, 1965, Ser. No. 465,848
Claims priority, application France, June 26, 1964, 979,776
1 Claim. (Cl. 277—11)

ABSTRACT OF THE DISCLOSURE

A pipe joint comprising two tubular elements having thin rigid outer plastic sheaths and a compressible sealing ring interposed between the elements, one of the elements having a socket within which the sealing ring is entirely disposed where as the other element has a male end extending into the socket, the sheath of the male end also extending into the socket, the socket being extended by an inner cylindrical portion which has a diameter exceeding by about 2–3% the diameter of the male end extending therein and an inner entrance face having a diameter substantially equal to that of the cylindrical portion and having substantially circumferential grooves which are quirks having rounded crests capable of coming in contact with the sheath on the male end extending into the socket.

---

Figure 1:
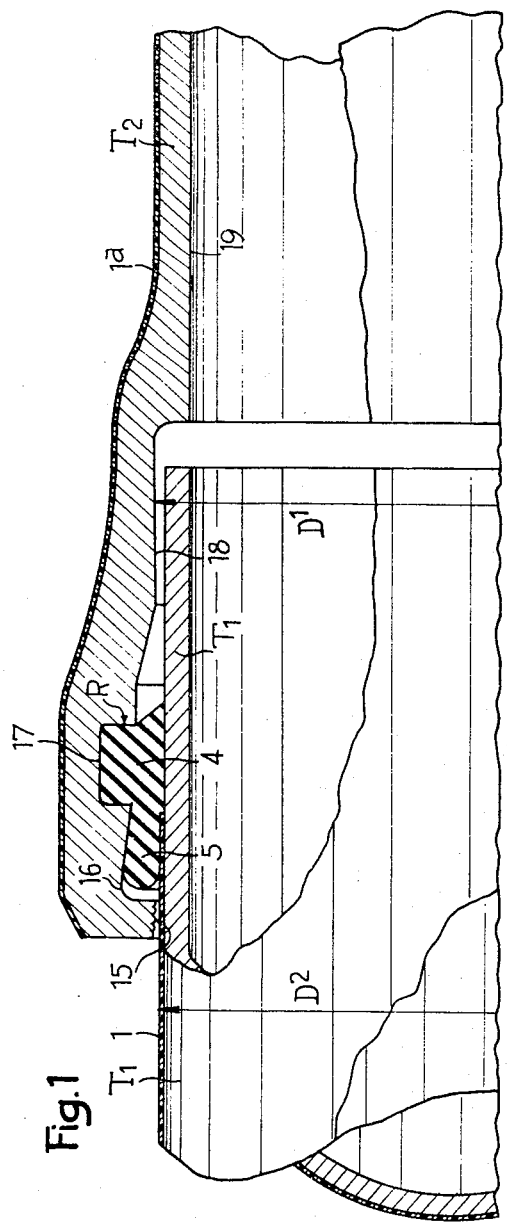

The present invention relates to joints between pipes or like piping elements.

In the French Patent No. 1,329,061 filed Apr. 27, 1962, the applicant discloses, firstly, a type of sealing ring comprising a massive body having an axial radial section in the shape of a polygon which is extended axially by an annular lip which terminates in a bead and is thinned down in the part thereof adjacent the body to which it is connected internally and externally by an inner ledge of small radial extent and by a larger outer shoulder respectively and, secondly, a joint between two pipes one of which has a male end and the other a socket which are provided with a thin outer rigid sleeve, a sealing ring of the aforementioned type being interposed between the male end and the socket, the lip of the ring being resiliently clamped against the sleeve of the male end and the end of said sleeve being in abutting relation to said inner ledge of the ring.

In the embodiment already described, the end face of the socket bears against the outer face of the ring between the end bead of the lip and the body of the ring, in other words the lip of the ring extends out of the socket.

The object of the present invention is to provide a variant of this joint between a male end of a pipe and the socket of another pipe wherein the sealing ring is entirely disposed in the socket and the end of the latter is extended by a cylindrical portion which has a diameter slightly greater than the outside diameter of the male end, the cylindrical portion and the inner face of the entrance of the socket forming therebetween two coaxial cylindrical guide faces for the male end.

According to another feature of the invention, said inner face of the entrance of the socket is grooved.

Further features and advantages of the invention will be apparent from the ensuing description, with reference to the accompanying drawing to which the invention is in no way limited.

Figure 2:
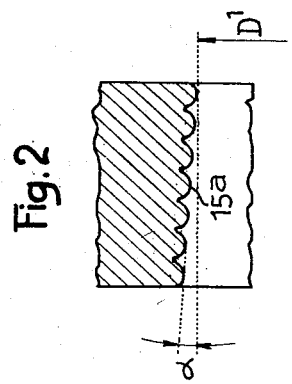

In the drawing:

FIG. 1 is a longitudinal half sectional view of a joint according to the invention, and FIG. 2 is a partial radial sectional view, on an enlarged scale, of the portion corresponding to the entrance of the socket.

In the illustrated embodiment, a joint is achieved between the smooth male end of the pipe $T_1$ and the socket of another pipe $T_2$, these pipes being covered with a thin sheath 1, or 1a, of plastics material, the sheath 1a being, if desired, extended over the socket.

In accordance with the invention, the inner face of the socket has, starting from the entrance end thereof, a profile consisting of a short annular face 15 followed by a first groove 16 intended to accommodate the lip 5 of the sealing ring R and then a second groove 17 intended to accommodate the outwardly projecting portion of the body 4 of the ring. The shapes of these recesses or grooves correspond to the outer shape of the ring. The groove 17 is connected to a cylindrical face 18 which is connected to the inner face 19 of the pipe $T_2$.

The diameters of the faces 15 and 18 are roughly equal and have a dimension $D^1$ slightly greater, namely of the order of 2–3%, greater than the outside diameter $D^2$ of the pipe $T_1$ (without the sheath).

Preferably, the face 15 has a slightly frustoconical shape and it is outwardly divergent with a slope of the order of 2–3°. This face is grooved for example by a series of quirks having rounded crests 15a, as shown in FIG. 2.

The pipes are assembled by inserting the smooth end of the pipe $T_1$ in the socket of the pipe $T_2$ (previously provided with its sealing ring) until the end of the pipe $T_1$ faces the face 18.

It will be observed that owing to the increase in the length of the socket the sheath 1 must terminate at a distance from the end face of the smooth end which is greater than in the embodiment of said patent.

The variant described hereinbefore has of course the same advantages as the embodiment described in said patent. Further, owing to the presence of the cylindrical face 18 and the entrance face 15 of the socket, when a pipe is lifted by one end the smooth end becomes wedged in the socket of the adjoining pipe which limits the angle of deviation between the two pipes and the deformation of the sealing ring. Consequently, it is possible to raise one end of a section of piping composed of several pipes without danger of uncoupling and without resulting in an excessive sag. This advantage is of utility when laying piping sections of any length which are obtained by assembling the pipes outside the excavation or trench and are lowered into the excavation in starting at one end and proceeding progressively, the section assuming the shape of an elongated S. This manner of proceeding avoids the necessity of assembling the joints in the excavation which could be difficult if the excavation is narrow, for example hardly greater than the diameter of the pipe. Indeed, in respect of pipes having a small diameter of the order of 100–200 mm., it would be very inconvenient, if not impossible, to have a workman assemble the joints directly at the bottom of the excavation.

It will be observed that the presence of the grooves having a rounded surface on the face 15 permits obtaining, when lifting the pipes, a good wedging of the smooth end of one pipe in the socket of the other and in particular a good support of the entrance of the socket on the sheath 1 without any danger of imparing the latter.

Although specific embodiments of the invention have been described, many modifications and changes may be made therein without departing from the scope of the invention as defined in the appended claims.

Having now described my invention what I claim as new and desire to secure by Letters Patent is:

1. Pipe joint assembly comprising two tubular elements, one of which has a male end having a substantially cylindrical end portion and the other a socket, said socket having an inner profile consisting, from the entrance end thereof, of a short annular inner entrance face followed by a frustoconical first groove and by a second cylindrical groove, a thin rigid plastic sheath disposed on the outer face of each element, the sheath of the tubular element having the male end extending into said socket, a compressible sealing ring entirely disposed within the socket, said ring having a lip portion fitting in said first groove and an outwardly projecting portion fitting in said second groove, the socket being extended inwardly of the corresponding tubular element by a cylindrical portion, said male end extending into said cylindrical portion, said cylindrical portion having an inner end having a diameter greater by about 2–3% than the outside diameter of the male end extending thereinto, said inner entrance face having an outwardly divergent slope of 2 to 3 degrees and a minimum diameter substantially equal to the diameter of said cylindrical portion, whereby said cylindrical portion and said entrance face of the socket constitute therebetween two coaxial guide faces for the male end, these guide faces limiting the deformation of the sealing ring and the angle of deviation between the two elements when lifting the pipe joint assembly, and substantially circumferentially extending grooves on said inner entrance face of the socket, said grooves being quirks having therebetween rounded crests adapted to frictionally contact said sheath on said male end extending into the socket when a deviation is produced upon lifting the pipe joint assembly.

References Cited

UNITED STATES PATENTS 2,953,398  9/1960  Haugen et al. _____ 277—207 X
2,991,092  7/1961  MacKay _____ 277—170

FOREIGN PATENTS 132,961  4/1963  France.

SAMUEL ROTHBERG, *Primary Examiner.*